Figure 1:
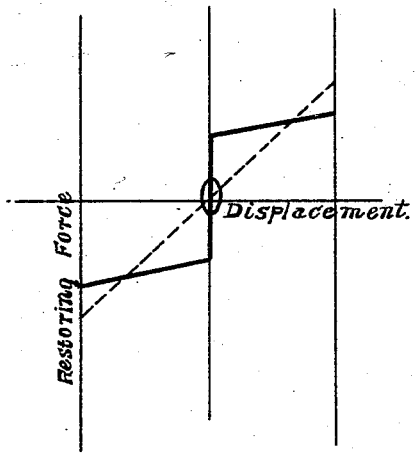

March 29, 1932.   F. W. CARTER   1,851,382
LOCOMOTIVE TRUCK
Filed Aug. 29, 1929    2 Sheets-Sheet 1

INVENTOR.
F. W. CARTER,
by Edward Williams
HIS ATTORNEY.

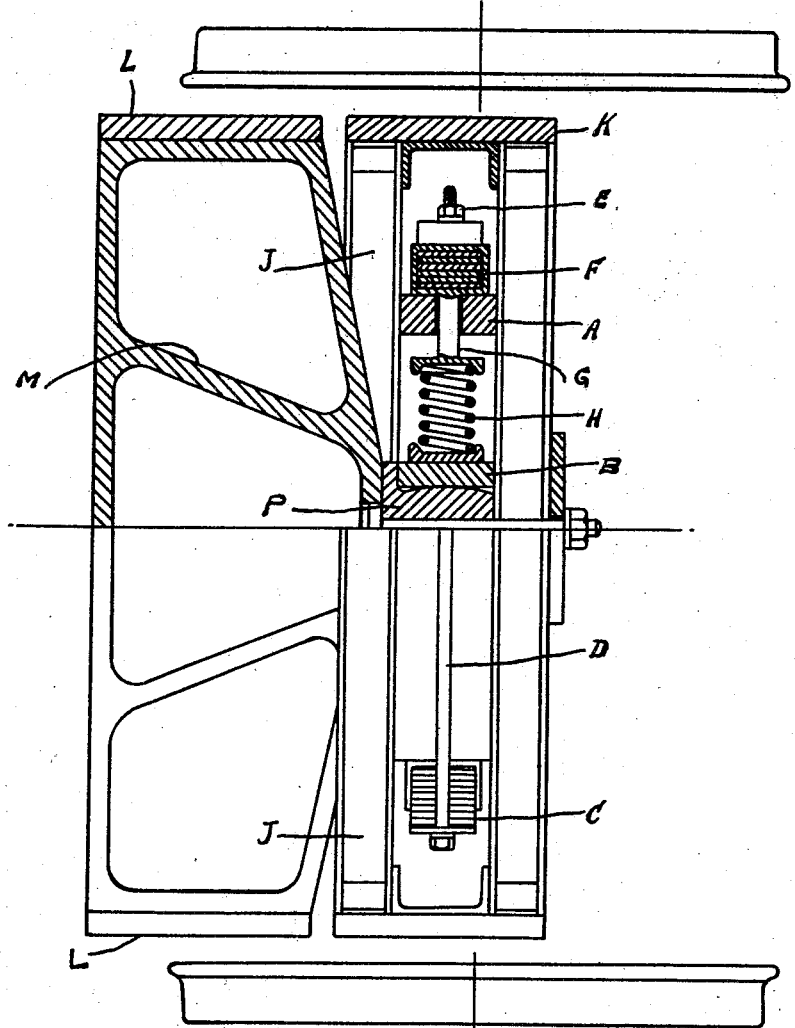

Patented Mar. 29, 1932

1,851,382

UNITED STATES PATENT OFFICE

FREDERICK WILLIAM CARTER, OF RUGBY, ENGLAND

LOCOMOTIVE TRUCK

Application filed August 29, 1929, Serial No. 389,217, and in Great Britain September 4, 1928.

This invention relates to locomotives of the type in which the frame is supported in part on one or more trucks which are capable of a certain amount of movement relatively to the frame. These auxiliary trucks are acted upon by certain forces which tend to return them, after displacement, to a central symmetrical position relatively to the frame, and it is through the agency of these forces that the locomotive can be guided around curves in the track. These forces also have considerable influence on the stability of running of the locomotive.

In some cases, such locomotives are provided with centring forces supplied by springs acting between the main frame and the auxiliary truck while, in other cases, the centring forces are due to gravity, movement of the auxiliary truck from the central position causing a portion of the weight of the locomotive to be lifted and setting up a force tending to restore the auxiliary truck to its central position. In cases in which there are simple springs or their equivalent between the frame and the auxiliary truck, the restoring force is substantially proportional to the displacement of the auxiliary truck from the central position, so that the curve between the restoring and displacement is a straight line if friction is neglected.

In practice, the centring devices are more commonly arranged so that considerable force is necessary to make an initial displacement, although further displacement does not result in a great increase of this force.

From the point of view of stability of running, a definite proportional relation between the restoring force and displacement is desirable. This relation may not, however, be desirable from the steering point of view, it may be, for example, that extreme displacement would require greater forces than the springs would bear, or than would be desirable, because of the flange pressures set up.

The general object of the invention is to improve the stability of running of locomotives of the type to which the invention relates. A more specific object of the invention is to provide for locomotives an improved form of auxiliary truck embodying a resilient system for its attachment to the frame of the locomotive which ensures that the forces which tend to centre the truck should vary according to its displacement from the centre and should have certain calculable magnitudes which may or may not agree with the centring forces most suitable for steering the locomotive on curves.

The invention together with other objects and advantages thereof may be more readily understood from reference to the following description of the accompanying drawing and will be pointed out more fully in the appended claims.

Figure 2:
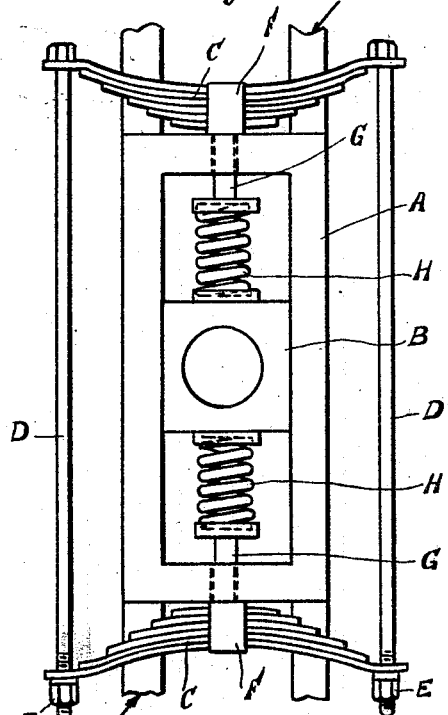

In the drawings, Fig. 1 is a graphical representation of certain factors which are present in the design of locomotive trucks as heretofore known and according to this invention; Fig. 2 is a plan view, somewhat diagrammatic of an embodiment of the invention; and Fig. 3 is an end view partially in section showing the relation of the truck to the locomotive frame.

Referring to Figs. 2 and 3, A represents a guide attached transversely to the frame of the auxiliary truck; B represents a sliding piece which carries a centre plate on which the main frame of the locomotive rests; C represents a pair of leaf springs connected at their ends by the rods D, whose length can be adjusted by the nuts E, so as to impose any required initial tension on the leaf springs. The buckles F of the springs rest on the transverse guide A, and carry rods G which pass freely through the ends of the guide A towards the sliding piece B. As the centring device is ordinarily constructed, the rods G are adjusted of such lengths as just to rest on the sliding piece B when the buckles are in contact with the guide A. With such construction as so far described, the sliding piece B could not be moved in either direction until the force imposed upon it exceeds the initial stress of the springs C, and the relation between displacement and centring force would be as shown in full line in Fig. 1.

Referring particularly to Fig. 3, J represents transverse girders or transoms of the auxiliary truck which are attached to the side frames K of the truck. L represents the side frames of the main locomotive structure, and M is a transverse girder connecting these side frames. Projecting from the underside of the girder M is a member P arranged to pivotally engage the sliding piece B thereby forming a connection between said locomotive frame and said auxiliary truck through the centering device.

According to the invention, I introduce between the rods G and the sliding piece B, a second or subsidiary pair of springs H, which determine the relation between centring force and displacement in the neighbourhood of the centre position. This centring force is proportional to the displacement, as shown in broken lines in Fig. 1. The proportionality continues until, either the whole load is taken from one of the subsidiary springs H, or the stress in the other spring H becomes equal to the initial stress of the springs C, which ever occurs first. Thereafter the stress increases at a smaller rate. The maximum stress in the springs H is limited to that in springs C.

By such an arrangement of compound springs, that portion of the displacement which is near the central position results in a restoring force exerted by the subsidiary springs, which is proportional to the displacement, and further displacement from the central position then introduces the restoring force due to the main springs. By suitably proportioning the two sets of springs, stability of running of the locomotive may be attained.

Instead of springs, a pendulous device, whereby the main frame is displaced against gravity, in a manner that is well known in this connection, may be used.

What I claim as new and desire to secure by Letters Patent of the United States is:—

1. In a locomotive, a frame, a truck laterally movable with respect to said frame, and resilient means for controlling the movement of said truck with respect to said frame only when a predetermined relative movement has taken place.

2. In a locomotive, a frame, a truck laterally movable with respect to said frame, resilient means for controlling the initial movement of said truck with respect to said frame, and further resilient means for controlling the relative movement of said truck and frame only when a predetermined initial relative movement has taken place.

3. In a locomotive, a frame, a truck movable with respect to said frame, resilient means for maintaining the truck in a normal position with respect to said frame and for producing a substantially linear relation between the displacement of said truck from its normal position and the force tending to restore said truck to its normal position, and means for altering the proportionality between said displacement and said restoring force when said truck has been displaced from its normal position by a predetermined amount.

4. In a locomotive, a frame, a truck laterally movable with respect to said frame, resilient means for maintaining said truck in a normal position with respect to said frame and for producing a substantially linear relation between the displacement of said truck from its normal position and the restoring force tending to restore said truck to its normal position, and further resilient means brought into effective operation when said truck has been displaced from said normal position by a predetermined amount for altering the proportionality between the displacement and the restoring force.

5. In a locomotive, a frame, a truck movable with respect to said frame, oppositely acting springs for maintaining said truck in a normal position with respect to said frame, and for producing for small movements of said truck a substantially linear relation between the displacement of said truck with respect to said frame and the force tending to restore said truck to its normal position, and further oppositely acting springs maintained under an initial predetermined load arranged so as to reduce the rate at which the restoring force increases with respect to the displacement when said truck has been displaced from its normal position by a predetermined amount.

6. In a locomotive, a frame and a truck movable with respect to said frame, said truck comprising a guide, a sliding piece movable in said guide upon which said frame is adapted to rest, oppositely arranged springs for controlling movement up to a predetermined amplitude of said sliding piece in said guide, and further oppositely disposed springs of less stiffness than said first mentioned springs placed under a predetermined stress and arranged to control movement of said slide greater than said predetermined amplitude.

7. In a locomotive, a frame and a truck movable with respect to said frame, said truck comprising a rectangular guide, a sliding piece movable in said guide upon which said frame is adapted to rest, oppositely arranged coil springs abutting on either side of said slide and between said slide and said guide, a leaf spring disposed at each end of said guide and having buckles carrying rods which extend through said guide and rest upon the end of one of said coil springs remote from said slide, said leaf springs being of less stiffness than said coil springs, and means for producing an initial predetermined compression of said leaf springs.

In witness whereof I have hereunto set my hand this 17th day of August, 1929.

F. W. CARTER.